(12) United States Patent
Grebe et al.

(10) Patent No.: US 10,730,494 B2
(45) Date of Patent: Aug. 4, 2020

(54) HOUSING COMPONENT OF A HOUSING OF A VEHICLE DEVICE CONDUCTING PRESSURE MEDIUM

(71) Applicant: KNORR-BREMSE SYSTEME FUER NUTZFAHRZEUGE GMBH, Munich (DE)

(72) Inventors: Jan Grebe, Munich (DE); Kai Werner, Bietigheim-Bissingen (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 0 days.

(21) Appl. No.: 15/575,620

(22) PCT Filed: May 23, 2016

(86) PCT No.: PCT/EP2016/000852
§ 371 (c)(1),
(2) Date: Nov. 20, 2017

(87) PCT Pub. No.: WO2016/188630
PCT Pub. Date: Dec. 1, 2016

(65) Prior Publication Data
US 2018/0154877 A1 Jun. 7, 2018

(30) Foreign Application Priority Data

May 26, 2015 (DE) .................. 10 2015 108 210

(51) Int. Cl.
*B60T 8/36* (2006.01)
*C08G 69/26* (2006.01)
(Continued)

(52) U.S. Cl.
CPC ............ *B60T 8/3675* (2013.01); *B60T 17/04* (2013.01); *C08G 69/265* (2013.01); *C08K 3/40* (2013.01);
(Continued)

(58) Field of Classification Search
CPC ...... B60T 8/3675; B60T 8/3605; B60T 17/04; C08K 7/14; C08K 3/40; C08K 77/06; C08G 69/265; C08L 77/06
See application file for complete search history.

(56) References Cited

U.S. PATENT DOCUMENTS 6,341,677 B1 * 1/2002 Oliver ................. B60G 15/12
188/290
8,190,328 B2 * 5/2012 Jovers ............... B60G 17/0523
303/122.15
(Continued)

FOREIGN PATENT DOCUMENTS

CN   101817978 A   9/2010
CN   102131664 A   7/2011
(Continued)

OTHER PUBLICATIONS

English Machine Translation of FR-2681840 (Year: 1993).*
(Continued)

*Primary Examiner* — Melody M Burch
(74) *Attorney, Agent, or Firm* — Norton Rose Fulbright US LLP

(57) ABSTRACT

Described is a housing component of a housing of a vehicle pressure-medium-conducting apparatus, including: at least one connector bore having an internal thread for screwing-in a connector element having an external thread for feeding and/or discharging the pressure medium to/from the apparatus; in which a material of the housing component is composed, at least in a region of the connector bore, of a
(Continued)

thermoplastic of PPA (polyphthalamide). Also described is a pressure-medium-conducting device of a vehicle, including: at least one housing having at least one housing component, wherein the housing component includes: at least one connector bore having an internal thread for screwing-in a connector element having an external thread for feeding and/or discharging the pressure medium to/from the apparatus; in which a material of the housing component is composed, at least in a region of the connector bore, of a thermoplastic of PPA (polyphthalamide).

15 Claims, 1 Drawing Sheet

(51) Int. Cl.
*C08K 7/14* (2006.01)
*C08L 77/06* (2006.01)
*B60T 17/04* (2006.01)
*C08K 3/40* (2006.01)

(52) U.S. Cl.
CPC ............... *C08K 7/14* (2013.01); *C08L 77/06* (2013.01); *B60T 8/3605* (2013.01)

(56) References Cited

U.S. PATENT DOCUMENTS

| | | | |
|---|---|---|---|
| 2004/0084990 A1* | 5/2004 | Ortt | H01R 39/385 310/239 |
| 2008/0216899 A1* | 9/2008 | Moreno | F16K 31/0637 137/219 |
| 2014/0298797 A1* | 10/2014 | Murayama | B60T 8/368 60/533 |
| 2017/0120881 A1* | 5/2017 | Grebe | B60T 8/3605 |

FOREIGN PATENT DOCUMENTS

| | | | | |
|---|---|---|---|---|
| DE | 102008028440 A1 | | 12/2000 | |
| DE | 102008028440 A1 | | 12/2009 | |
| DE | 102008051629 A1 | | 4/2010 | |
| DE | 102009030898 A1 | * | 12/2010 | ............ B60T 8/3605 |
| DE | 202012006860 U1 | | 12/2013 | |
| EP | 1591675 A2 | | 11/2005 | |
| FR | 2681840 A1 | | 4/1993 | |
| JP | 2013112081 A1 | * | 6/2013 | |
| WO | 2008/106631 A1 | | 9/2008 | |
| WO | 2010/139369 A1 | | 12/2010 | |
| WO | 2012/084712 A1 | | 6/2012 | |
| WO | 2014/199045 A1 | | 12/2014 | |
| WO | 2015/011001 A1 | | 1/2015 | |
| WO | 2015011001 A1 | | 1/2015 | |

OTHER PUBLICATIONS

English Machine Translation of JP-2013112081 (Year: 2013).*
International Search Report dated Aug. 1, 2016, of the corresponding International Application PCT/EP2016/000852 filed May 23, 2016.

* cited by examiner

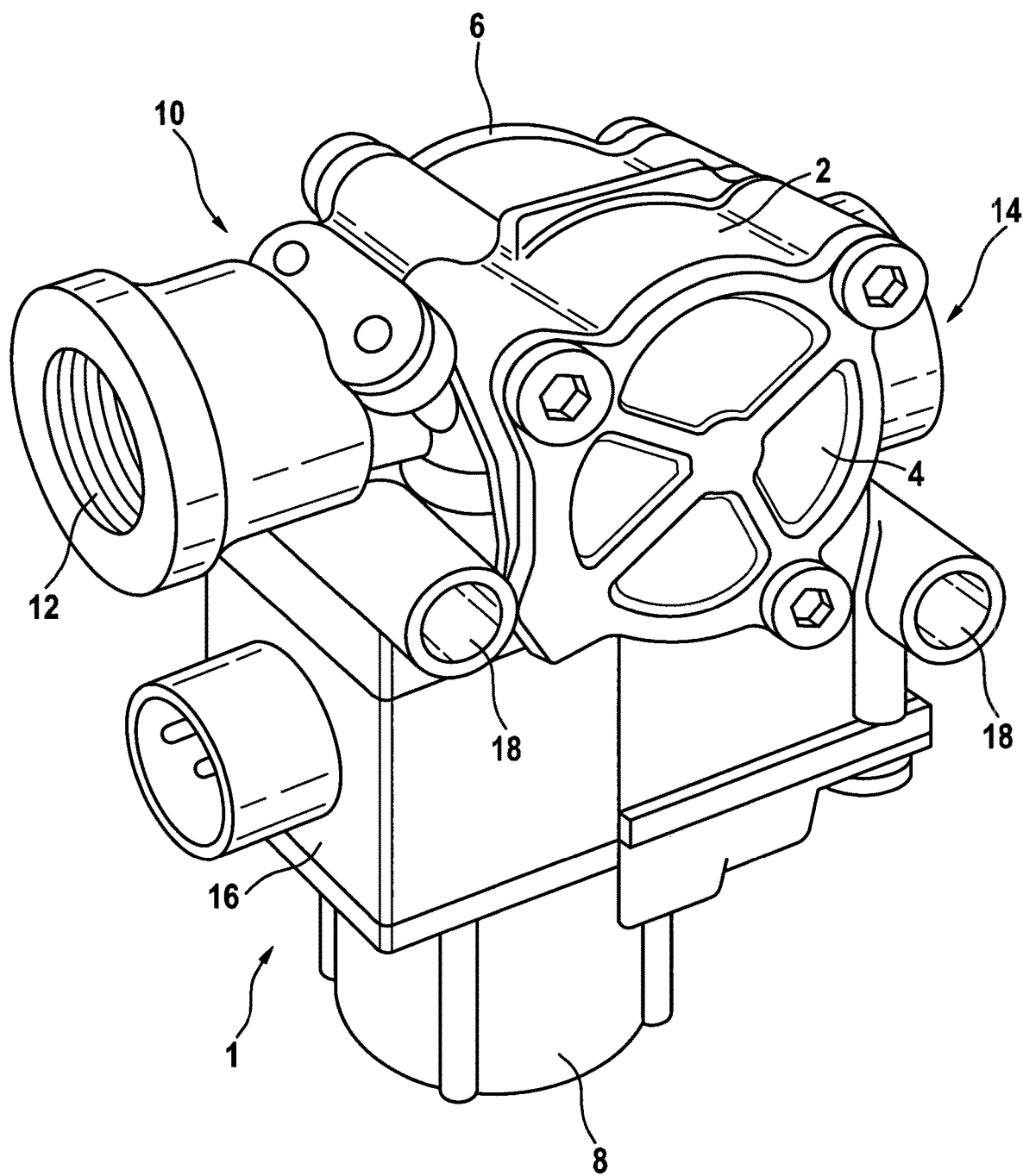

HOUSING COMPONENT OF A HOUSING OF A VEHICLE DEVICE CONDUCTING PRESSURE MEDIUM

FIELD OF THE INVENTION

The present invention proceeds from a housing component of a housing of a pressure-medium-conducting apparatus of a vehicle, having at least one connector bore which is equipped with an internal thread and which serves for the screwing-in of a connector element equipped with an external thread for the feed and/or discharge of the pressure medium to or from the apparatus.

BACKGROUND INFORMATION

A fastening of the connector element, which is for example connected to a pressure medium line, to the housing component of the housing is accordingly performed by virtue of the connector element being screwed into the connector bore. Then, fluid conducted in the pressure medium line, in particular compressed air or hydraulic liquid, can flow from the pressure medium line into the interior of the housing component or of the housing and in the opposite direction.

A problem in the case of such screw connections between a connector element and a connector bore of a housing component consists in that, in particular, the connector bore in the housing component must have material characteristics which permit such a high tightening and release moment of the threaded connection that the threaded connection does not loosen even under extreme temperatures and vibration loading.

A generic housing component is discussed, for example, in DE 10 2008 028 440 A1. In this document, a housing component, which has two such connector bores for the feed and discharge of compressed air, of a housing of an ABS pressure control valve is a light metal injection molding, and in particular an aluminum diecast component. Although the material characteristics of such an aluminum diecast component permit relatively high tightening and release moments for screw connections, it is relatively expensive to produce.

SUMMARY OF THE INVENTION

The present invention is based on the object of providing a housing component of the type mentioned in the introduction such that, being inexpensive to produce, it can ensure a secure screw connection between the connector element of the pressure medium line and the connector bore.

The object may be achieved according to the invention by the features described herein.

A housing component is to be understood to mean a separate component of a housing, in which further, arbitrary structural elements of the pressure-medium-conducting apparatus are at least partially accommodated. Together with at least one further housing component, for example a cover, the housing component may then form a complete housing, in which the housing components are fastened to one another or to a housing frame. Alternatively, the housing component may also constitute the only housing component of the housing, for example if the components accommodated by the housing are encapsulated with the PPA (polyphthalamide) plastic.

In the region of the connector bore means that that wall of the housing component which is subjected to direct load by the screw connection between the connector element and the connector bore is composed of PPA (polyphthalamide). The entire housing component may be an injection molding composed of PPA (polyphthalamide). It is alternatively also may be provided for only a section of the housing component in the region of the connector bore to be manufactured from PPA (polyphthalamide), and for a further section to be manufactured from a different material, for example from aluminum or PA (polyamide) plastic and connected to a connector bore section composed of PPA (polyphthalamide).

It is therefore provided according to the invention that the material of the housing component is composed, at least in the region of the connector bore, of a thermoplastic in the form of PPA (polyphthalamide). Said material has material characteristics, in particular with regard to modulus of elasticity and material stiffness, such that screw connections between the connector element and the connector bore can be produced with a tightening and release moment which, even after high and sustained temperature loading, such as for example 85° C. for 250 h or an equivalent loading in accordance with the Arrhenius relationship, such as is encountered in a vehicle, is greater than 25% of the breaking moment. A high tightening and release moment in turn has a positive effect on the resistance in relation to a release of the screw connection, in particular with regard to extreme temperatures and vibration loading. Trade names for PPA (polyphthalamide) are for example EMS Grivory® HTV5 H1 or Dupont Zytel®. The product designation of the PPA (polyphthalamide) in accordance with ISO 1874 is in particular PA6T/61, MH, 12-190, GF 50.

In particular, the breaking moment of such a plastic in the case of an M16 connector bore is approximately 95 Nm, the tightening moment is 70 Nm, and the release moment after ageing is 30 Nm.

The above-described thermoplastic has the characteristic, by contrast to PA (polyamide), that it softens or creeps to a lesser extent under continuous loading with high contact pressures owing to the screw connection and also as a result of temperature influences, such that the housing component remains substantially dimensionally stable even under such loading. In particular, it is then the case that no threaded bushing composed of metal, which has a connector bore for the connector element, is provided in the housing component configured according to the invention, or no such threaded bushing composed of metal is necessary.

Advantageous refinements and improvements of the invention specified herein are possible by the measures specified further herein.

In one refinement, the housing component is manufactured entirely from the PPA (polyphthalamide) plastic, in particular as an injection molding.

The PPA (polyphthalamide) thermoplastic may be fiber-reinforced, which leads to an even higher strength. In particular, a glass fiber reinforcement is provided, in particular with 30-65 wt. % glass fiber reinforcement.

In particular, the PPA (polyphthalamide) thermoplastic has at least one of the following characteristics: a tensile modulus of elasticity of at least 17,500 MPa, a breaking strength of at least 240 MPa, an elongation at break of 2%, an impact strength of 80 kJ/m$^2$, a notched impact strength of 11 kJ/m$^2$, a ball impression hardness of at least 340 MPa, a melting temperature of at least 325° C., a dimensional stability HDT/A up to at least 285° C., a thermal longitudinal expansion longitudinally of at most 0.15 $10^{-4}$/K, a thermal longitudinal expansion transversely of at most 0.40 $10^{-4}$/K, a density of at least 1.65 g/cm$^3$, a water absorption of at most 3.0%, a moisture absorption of at most 1.3%.

In one refinement, the housing component may have at least one integrated screw eyelet for the leadthrough of a screw or of a bolt for the fastening of the apparatus to a structure of the vehicle, wherein the material at least in the region of the screw eyelet is composed of the thermoplastic in the form of PPA (polyphthalamide).

For the fastening of the housing component or of the housing to the vehicle, a screw or threaded bolt is inserted through the at least one screw eyelet and is screwed into a threaded bore for example on the structure of the vehicle. Here, the screws or the threaded bolts are tightened with a tightening torque that ensures that the screw connection does not loosen after more than 250 hours at 85 degrees Celsius and/or fifty temperature cycles between minus 40 degrees and 85 degrees and/or two hours at minus 40 degrees and/or being exposed to an acceleration of more than 5 g and/or a vibration profile according to ISO. The relatively high tightening torque for this purpose is then maintained even over a relatively long time period because, by contrast, the PPA (polyphthalamide) thermoplastic from which the housing component is manufactured at least in the region of the at least one screw eyelet does not creep or soften.

A pressure-medium-conducting device of a vehicle particularly may have at least one housing having at least one housing component as described above.

A housing which is particularly inexpensive to manufacture is obtained if, aside from said one housing component, at least one further housing component or all housing components of the housing of the pressure-medium-conducting device is/are composed of the PPA (polyphthalamide) thermoplastic.

The pressure-medium-conducting device is in particular a valve device which conducts compressed air or hydraulic fluid as pressure medium, and one of the following valve devices: an ABS pressure control valve, an ASR (drive slip regulation) valve, a relay valve, a multi-way valve, a multi-way solenoid valve, a brake valve, an air treatment valve, an auxiliary valve, a trailer EBS valve, a tractor vehicle EBS valve, a clutch actuator.

In particular, the pressure-medium-conducting device is formed by an ABS pressure control valve of a service brake device of a vehicle, which has a first connector bore for the feed of the pressure medium from a pressure medium source and a second connector bore for the discharge of the pressure medium into a pressure-medium-operated brake actuator.

The invention will be described in more detail below on the basis of an exemplary embodiment with reference to the appended drawing.

BRIEF DESCRIPTION OF THE DRAWING

The FIGURE shows a perspective illustration of an ABS pressure control valve as an exemplary embodiment of the invention.

DETAILED DESCRIPTION

The ABS pressure control valve 1 shown in the FIGURE as an exemplary embodiment of the invention has the task, if the braked wheel assigned thereto exhibits a tendency to lock during a braking operation, of adapting the brake pressure in the wheel. For this purpose, the ABS pressure control valve 1 is connected at one side to a break-pressure-generating source (e.g. service brake transducer) and at the other side to a brake actuator, for example a brake cylinder, and for this purpose, can pass through, hold or reduce the brake pressure input into it. Here, the ABS pressure control valve 1 is for example a constituent part of an electropneumatic service brake device of a utility vehicle. The FIGURE shows the ABS pressure control valve 1 in a usage position, that is to say components arranged at the top in the FIGURE are also arranged at the top in the state in which the ABS pressure control valve is mounted for example on a frame of a utility vehicle.

The ABS pressure control valve has multiple housing parts, in this case for example an upper housing part 2 with two lateral covers 4, 6 and a lower housing part 8, which together form the housing 10 of the ABS pressure control valve 1. In the upper housing part 2 there are provided two connector bores 12, 14 equipped with an internal thread. Said connector bores 12, 14 serve in each case for the screwing-in of a connector element (not shown here) having a complementary external thread, wherein the connector elements are in each case connected to a line which conducts pressure medium, in this case compressed air.

In particular, a first connector bore 12 serves for the screwing-in or connection of a first connector element, which is connected via a pneumatic line for example to a duct of a pressure regulating module of the electropneumatic service brake device. The feed of compressed air then takes place via said first connector bore 12. The second connector bore 14 serves for the screwing-in or connection of a second connector element, which is connected via a pneumatic line for example to a pneumatic service brake cylinder of the electropneumatic service brake device. The discharge of compressed air then takes place via said second connector bore 14.

In the housing 10, there are accommodated two diaphragm valves, which have diaphragms loaded by spring elements, and electromagnetic control valves, which are actuable by an external electronic ABS control unit, for the pilot control of the diaphragm valves. The electrical connection of the electromagnetic control valves to the ABS control unit is realized by an electrical connector device 16 which is accommodated in a recess of the housing 10. The construction of an ABS pressure control valve of said type is discussed in detail, for example, in DE 10 2008 028 440 A1.

Here, the ABS pressure control valve 1 is for example a constituent part of an electropneumatic service brake device of a utility vehicle, in particular of an electronically brake-pressure-regulated brake system (EBS).

Furthermore, the housing 10 has, for example in the upper housing part 2, for example two screw eyelets 18, wherein central axes of the screw eyelets 18 are for example arranged parallel to one another. In the upper housing part 2, the screw eyelets 18 form passage openings, that is to say they extend from one housing part side to the other housing part side averted from said one housing part side. In the case of the screw eyelets, the ratio between the outer diameter (Da) and the inner diameter (di) particularly may be less than 2.2. It would alternatively also be possible for at least one screw eyelet 18 to be formed on a plate-like flange which projects away from the housing 10.

At least the upper housing part 2 is manufactured entirely from PPA (polyphthalamide) plastic, and in particular is injection-molded from said thermoplastic. For example, the PPA (polyphthalamide) thermoplastic may also be fiber-reinforced, in particular glass-fiber-reinforced. In particular, a glass fiber reinforcement with 30-65 wt. % glass fiber reinforcement is provided. All housing parts 2, 4, 6, 8 may be produced from PPA (polyphthalamide) thermoplastic.

In particular, the PPA (polyphthalamide) thermoplastic has at least some of the following characteristics: a tensile modulus of elasticity of at least 17,500 MPa, a breaking strength of at least 240 MPa, an elongation at break of 2%, an impact strength of 80 kJ/m$^2$, a notched impact strength of 11 kJ/m$^2$, a ball impression hardness of at least 340 MPa, a melting temperature of at least 325° C., a dimensional stability HDT/A up to at least 285° C., a thermal longitudinal expansion longitudinally of at most 0.15 10$^{-4}$/K, a thermal longitudinal expansion transversely of at most 0.40 10$^{-4}$/K, a density of at least 1.65 g/cm$^3$, a water absorption of at most 3.0%, a moisture absorption of at most 1.3%.

For the fastening of the ABS pressure control valve to a frame of the utility vehicle, screws or threaded bolts are inserted through the screw eyelets 18 and are screwed into threaded bores on the frame of the utility vehicle. Furthermore, the pneumatic lines are connected by the connector elements to the connector bores 12, 14 by virtue of the connector elements being screwed into the connector bores 12, 14.

Here, the screws or the threaded bolts and connector elements are tightened with a tightening torque that ensures that the screw connections do not loosen after more than 250 hours at 85 degrees Celsius and/or fifty temperature cycles between minus 40 degrees and 85 degrees and/or two hours at minus 40 degrees and/or being exposed to an acceleration of more than 5 g and/or a vibration profile according to ISO. The relatively high tightening torque for this purpose is then maintained even over a relatively long time period because, by contrast, the PPA (polyphthalamide) thermoplastic from which at least the upper housing part 2 is manufactured exhibits a lower tendency to creep or soften.

The list of reference designations is as follows:
1 ABS pressure control valve
2 Upper housing part
4 Cover
6 Cover
8 Lower housing part
10 Housing
12 First connector bore
14 Second connector bore
16 Connector device
18 Screw eyelet

The invention claimed is:

1. A housing component of a housing of a pressure-medium-conducting apparatus of a vehicle, comprising:
at least one connector bore having an internal thread and which serves for screwing-in a connector element having an external thread for feeding and/or discharging a pressure medium to or from the pressure-medium-conducting apparatus;
wherein a material of the housing component is composed, at least in a region of the at least one connector bore, of a thermoplastic in the form of PPA (polyphthalamide),
wherein the pressure-medium-conducting apparatus includes an anti-lock braking system (ABS) pressure control valve,
wherein the at least one connector bore includes a first connector bore and a second connector bore,
wherein the housing includes screw eyelets, which form passage openings extending from one housing part side to another housing part side averted from the one housing part side, and
wherein a ratio between an outer diameter and an inner diameter of each of the screw eyelets is less than about 2.2,
wherein the ABS pressure control valve has multiple housing parts, including the housing component, which is an upper housing part with lateral covers, and a lower housing part, which together form the housing of the ABS pressure control valve, wherein the upper housing part includes the first connector bore and the second connector bore,
wherein the first connector bore is for connecting a first connector element, which is connected via a pneumatic line, so that the feed of compressed air takes place via the first connector bore, and wherein the second connector bore is for connecting a second connector element, which is connected via another pneumatic line, so that the discharge of compressed air takes place via the second connector bore,
wherein the housing has the upper housing part having screw eyelets, wherein central axes of the screw eyelets are arranged parallel to one another, wherein in the upper housing part, the screw eyelets form the passage openings extending from the one housing part side to the other housing part side averted from the one housing part side,
wherein the first connector bore and the second connector bore are positioned on opposite sides of the upper housing part so that inputs of the connector bores open in an opposite direction to one another,
wherein the screw eyelets include a first screw eyelet and a second screw eyelet, wherein the first screw eyelet lies beneath the first connector bore so that a longitudinal screw axis of the first screw eyelet is perpendicular to a longitudinal axis of the input of the first connector bore, and wherein the second screw eyelet lies beneath the second connector bore so that a longitudinal screw axis of the second screw eyelet is perpendicular to a longitudinal axis of the input of the second connector bore, and
wherein the lateral covers include two lateral covers which lie along an axis that is perpendicular to longitudinal axes of the connector bores, and the lateral covers are positioned so as to oppose one another.

2. The housing component of claim 1, wherein the housing component is manufactured entirely from the PPA (polyphthalamide) plastic.

3. The housing component of claim 1, wherein the PPA (polyphthalamide) thermoplastic is fiber-reinforced.

4. The housing component of claim 1, wherein the PPA (polyphthalamide) thermoplastic is glass-fiber-reinforced with a 30-65 wt. % glass fiber reinforcement.

5. The housing component of claim 1, wherein the housing includes an injection molding.

6. The housing component of claim 1, wherein the PPA (polyphthalamide) thermoplastic includes at least one of the following characteristics: a tensile modulus of elasticity of at least 17,500 MPa, a breaking strength of at least 240 MPa, an elongation at break of 2%, an impact strength of 80 kJ/m$^2$, a notched impact strength of 11 kJ/m$^2$, a ball impression hardness of at least 340 MPa, a melting temperature of at least 325° C., a dimensional stability HDT/A up to at least 285° C., a thermal longitudinal expansion longitudinally of at most 0.15 10$^{-4}$/K, a thermal longitudinal expansion transversely of at most 0.40 10$^{-4}$/K, a density of at least 1.65 g/cm$^3$, a water absorption of at most 3.0%, and a moisture absorption of at most 1.3%.

7. The housing component of claim 1, wherein at least one of the screw eyelets includes at least one integrated screw eyelet for the leadthrough of a screw or of a bolt for the fastening of the apparatus to a structure of the vehicle, and wherein the material at least in the region of the at least one of the screw eyelets composed of the thermoplastic in the form of PPA (polyphthalamide).

8. A pressure-medium-conducting device of a vehicle, comprising:
a housing having a housing component, wherein the housing component includes:
at least one connector bore having an internal thread and which serves for screwing-in a connector element having an external thread for feeding and/or discharging the pressure medium to or from the device;
wherein a material of the housing component is composed, at least in a region of the at least one connector bore, of a thermoplastic in the form of PPA (polyphthalamide),
wherein the pressure-medium-conducting device includes an anti-lock braking system (ABS) pressure control valve,
wherein the at least one connector bore includes a first connector bore and a second connector bore,
wherein the housing includes screw eyelets, which form passage openings extending from one housing part side to another housing part side averted from the one housing part side, and
wherein a ratio between an outer diameter and an inner diameter of each of the screw eyelets is less than about 2.2,
wherein the ABS pressure control valve has multiple housing parts, including the housing component, which is an upper housing part with lateral covers, and a lower housing part, which together form the housing of the ABS pressure control valve, wherein the upper housing part includes the first connector bore and the second connector bore,
wherein the first connector bore is for connecting a first connector element, which is connected via a pneumatic line, so that the feed of compressed air takes place via the first connector bore, and wherein the second connector bore is for connecting a second connector element, which is connected via another pneumatic line, so that the discharge of compressed air takes place via the second connector bore, and
wherein the housing has the upper housing part having screw eyelets, wherein central axes of the screw eyelets are arranged parallel to one another, wherein in the upper housing part, the screw eyelets form the passage openings extending from the one housing part side to the other housing part side averted from the one housing part side,
wherein the first connector bore and the second connector bore are positioned on opposite sides of the upper housing part so that inputs of the connector bores open in an opposite direction to one another,
wherein the screw eyelets include a first screw eyelet and a second screw eyelet, wherein the first screw eyelet lies beneath the first connector bore so that a longitudinal screw axis of the first screw eyelet is perpendicular to a longitudinal axis of the input of the first connector bore, and wherein the second screw eyelet lies beneath the second connector bore so that a longitudinal screw axis of the second screw eyelet is perpendicular to a longitudinal axis of the input of the second connector bore, and
wherein the lateral covers include two lateral covers which lie along an axis that is perpendicular to longitudinal axes of the connector bores, and the lateral covers are positioned so as to oppose one another.

9. The pressure-medium-conducting device of claim 8, wherein the housing component of the housing of the pressure-medium-conducting device is composed of the PPA (polyphthalamide) thermoplastic.

10. The pressure-medium-conducting device of claim 8, wherein the ABS pressure control valve conducts compressed air or hydraulic fluid as pressure medium.

11. The pressure-medium-conducting device of claim 8, wherein the ABS pressure control valve is of a service-brake device of a vehicle, wherein the ABS pressure control valve has the first connector bore to feed the pressure medium from a pressure medium source and the second connector bore to discharge the pressure medium into a pressure-medium-operated brake actuator.

12. The pressure-medium-conducting device of claim 8, wherein the housing component is manufactured from the PPA (polyphthalamide) plastic, wherein the PPA (polyphthalamide) thermoplastic is fiber-reinforced, wherein the PPA (polyphthalamide) thermoplastic is glass-fiber-reinforced with a 30-65 wt. % glass fiber reinforcement, and wherein at least one of the screw eyelets includes at least one integrated screw eyelet for the leadthrough of a screw or of a bolt for the fastening of the apparatus to a structure of the vehicle, and wherein the material at least in the region of the at least one of the screw eyelets is composed of the thermoplastic in the form of PPA (polyphthalamide).

13. The pressure-medium-conducting device of claim 12, wherein the PPA (polyphthalamide) thermoplastic includes at least one of the following characteristics: a tensile modulus of elasticity of at least 17,500 MPa, a breaking strength of at least 240 MPa, an elongation at break of 2%, an impact strength of 80 kJ/m$^2$, a notched impact strength of 11 kJ/m$^2$, a ball impression hardness of at least 340 MPa, a melting temperature of at least 325° C., a dimensional stability HDT/A up to at least 285° C., a thermal longitudinal expansion longitudinally of at most 0.15 10$^{-4}$/K, a thermal longitudinal expansion transversely of at most 0.40 10$^{-4}$/K, a density of at least 1.65 g/cm$^3$, a water absorption of at most 3.0%, and a moisture absorption of at most 1.3%.

14. The housing component of claim 1, wherein the housing component is manufactured from the PPA (polyphthalamide) plastic, wherein the PPA (polyphthalamide) thermoplastic is fiber-reinforced, wherein the PPA (polyphthalamide) thermoplastic is glass-fiber-reinforced with a 30-65 wt. % glass fiber reinforcement, and wherein at least one of the screw eyelets includes at least one integrated screw eyelet for the leadthrough of a screw or of a bolt for the fastening of the apparatus to a structure of the vehicle, and wherein the material at least in the region of the at least one of the screw eyelets is composed of the thermoplastic in the form of PPA (polyphthalamide).

15. The housing component of claim 14, wherein the PPA (polyphthalamide) thermoplastic includes at least one of the following characteristics: a tensile modulus of elasticity of at least 17,500 MPa, a breaking strength of at least 240 MPa, an elongation at break of 2%, an impact strength of 80 kJ/m$^2$, a notched impact strength of 11 kJ/m$^2$, a ball impression hardness of at least 340 MPa, a melting temperature of at least 325° C., a dimensional stability HDT/A up to at least 285° C., a thermal longitudinal expansion longitudinally of at most 0.15 10$^{-4}$/K, a thermal longitudinal expansion transversely of at most 0.40 10$^{-4}$/K, a density of at least 1.65 g/cm$^3$, a water absorption of at most 3.0%, and a moisture absorption of at most 1.3%.

* * * * *